United States Patent
Kim et al.

(10) Patent No.: US 10,643,791 B2
(45) Date of Patent: May 5, 2020

(54) DIELECTRIC MATERIAL, MULTI-LAYERED CAPACITORS AND ELECTRONIC DEVICES COMPRISING THE SAME

(71) Applicant: SAMSUNG ELECTRONICS CO., LTD., Suwon-si, Gyeonggi-do (KR)

(72) Inventors: Hyun Sik Kim, Suwon-si (KR); Yoon Chul Son, Hwaseong-si (KR); Kyoung-Seok Moon, Hwaseong-si (KR); Daejin Yang, Yeongju-si (KR); Chan Kwak, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 14 days.

(21) Appl. No.: 16/033,392

(22) Filed: Jul. 12, 2018

(65) Prior Publication Data

US 2019/0304685 A1    Oct. 3, 2019

(30) Foreign Application Priority Data

Mar. 28, 2018    (KR) .................. 10-2018-0036145

(51) Int. Cl.
*H01G 4/12*    (2006.01)
*C04B 35/47*    (2006.01)
(Continued)

(52) U.S. Cl.
CPC ........... *H01G 4/1227* (2013.01); *C04B 35/47* (2013.01); *C04B 35/6261* (2013.01);
(Continued)

(58) Field of Classification Search
CPC .... C04B 35/4682; C04B 35/47; H01G 4/1227
See application file for complete search history.

(56) References Cited

U.S. PATENT DOCUMENTS 3,900,246 A    8/1975    Kimura et al.
7,385,239 B2    6/2008    Wang
(Continued)

FOREIGN PATENT DOCUMENTS

JP    2007180297 A    *    7/2007    ....... C04B 35/62685
JP    4666269 B2    4/2011
(Continued)

OTHER PUBLICATIONS

M. H. Frey et al., "The role of interfaces on an apparent grain size effect on the dielectric properties for ferroelectric barium titanate ceramics", Ferroelectrics, Mar. 7, 2011, pp. 337-353, vol. 206-207, Issue 1, 1998 OPA.
(Continued)

*Primary Examiner* — Karl E Group
(74) *Attorney, Agent, or Firm* — Cantor Colburn LLP

(57) ABSTRACT

Disclosed are a dielectric material, a multi-layered capacitor, and an electronic device including the same. The dielectric material includes a dielectric material particle represented by $ADO_3$, wherein A includes Sr, Ba, Ca, Pb, K, Na, or a combination thereof, D includes Ti, Zr, Mg, Nb, Ta, or a combination thereof, the dielectric material particle includes about 2.5 moles to about 4 moles of the donor element, based on 100 moles of D, and a diameter of the dielectric material particle is in a range of from about 100 nanometers to about 300 nanometers.

16 Claims, 14 Drawing Sheets

(51) Int. Cl.
*C04B 35/468* (2006.01)
*H01G 4/30* (2006.01)
*C04B 35/63* (2006.01)
*C04B 35/626* (2006.01)
*C04B 35/64* (2006.01)
*H01G 4/248* (2006.01)
*H01G 4/232* (2006.01)

(52) U.S. Cl.
CPC .... *C04B 35/6264* (2013.01); *C04B 35/62655* (2013.01); *C04B 35/62695* (2013.01); *C04B 35/6303* (2013.01); *C04B 35/64* (2013.01); *H01G 4/1236* (2013.01); *H01G 4/30* (2013.01); *C04B 2235/3227* (2013.01); *C04B 2235/3236* (2013.01); *C04B 2235/3262* (2013.01); *C04B 2235/604* (2013.01); *C04B 2235/606* (2013.01); *C04B 2235/6567* (2013.01); *C04B 2235/6582* (2013.01); *C04B 2235/768* (2013.01); *C04B 2235/85* (2013.01); *H01G 4/232* (2013.01); *H01G 4/248* (2013.01)

(56) References Cited

U.S. PATENT DOCUMENTS

| | | | |
|---|---|---|---|
| 7,583,493 B2 | 9/2009 | Tani et al. | |
| 7,872,854 B2* | 1/2011 | Kawamoto | B82Y 30/00 |
| | | | 361/311 |
| 8,040,658 B2* | 10/2011 | Kawamoto | C01G 23/006 |
| | | | 361/306.1 |
| 8,367,206 B2 | 2/2013 | Park et al. | |
| 8,901,708 B2 | 12/2014 | Hashim et al. | |
| 9,382,162 B2 | 7/2016 | Kang et al. | |
| 2010/0103587 A1* | 4/2010 | Kawamoto | C01G 23/006 |
| | | | 361/321.1 |
| 2013/0194718 A1 | 8/2013 | Matsuda | |
| 2015/0098166 A1 | 4/2015 | Kang et al. | |

FOREIGN PATENT DOCUMENTS

| | | |
|---|---|---|
| JP | 4823895 B2 | 11/2011 |
| JP | 5566183 B2 | 8/2014 |
| JP | 5701013 B2 | 4/2015 |
| KR | 100648862 B1 | 11/2006 |
| KR | 100955802 B1 | 5/2010 |
| KR | 20130062343 A | 6/2013 |
| KR | 101376924 B1 | 3/2014 |
| WO | 2015125520 A1 | 8/2015 |

OTHER PUBLICATIONS

Sung-Yoon Chung et al., "Effects of donor concentration and oxygen partial pressure on interface morphology and grain growth behavior in SrTiO3", Acta Materialia, Aug. 1, 2002, pp. 3361-3371, vol. 50, Issue 13, Published by Elsevier Science Ltd.

* cited by examiner

DIELECTRIC MATERIAL, MULTI-LAYERED CAPACITORS AND ELECTRONIC DEVICES COMPRISING THE SAME

CROSS-REFERENCE TO RELATED APPLICATION

This application claims priority to and the benefit of Korean Patent Application No. 10-2018-0036145 filed in the Korean Intellectual Property Office on Mar. 28, 2018, and all the benefits accruing therefrom under 35 U.S.C. § 119, the entire content of which is incorporated herein by reference.

BACKGROUND

1. Field

A dielectric material and a multi-layered capacitor and an electronic device including the same are disclosed.

2. Description of the Related Art

A multi-layer ceramic capacitor (MLCC), which is a small-size capacitor having a large capacitance, is an electronic device obtained by laminating a dielectric ceramic composition and an internal electrode and firing the same simultaneously. According to the continuously evolving demands for electronic devices to be provided in a small size, with a thin film, and with higher capacitance, demands have been increased to develop a capacitor having further smaller size and thinner thickness, and higher capacitance than a multi-layered ceramic condenser structure.

A capacitance of the dielectric material may be proportional to a dielectric constant and the number of laminated dielectric layers and to be inversely proportional to a thickness of the dielectric layer, and a thickness of the dielectric layer included in the multi-layer ceramic capacitor may be reduced to and/or the number of dielectric layers may be increased.

Reducing the thickness of the dielectric layer may be limited when the dielectric layer is formed using a known material.

To reduce the thickness of the dielectric layer, a particle size of the dielectric material for the dielectric layer may be reduced. As the dielectric constant of the dielectric material is proportional to the particle size of the dielectric material, if the thickness of the dielectric layer is greatly or excessively decreased, a desirable dielectric constant for the dielectric layer may not be provided.

SUMMARY

Provided is a dielectric material exhibiting a high dielectric constant even if a particle diameter is reduced according to decreasing a thickness of the dielectric layer; and a multi-layered capacitor and an electronic device including the same.

According to an embodiment, a dielectric material includes a dielectric material particle represented by $ADO_3$, wherein A includes Sr, Ba, Ca, Pb, K, Na, or a combination thereof, D includes Ti, Zr, Mg, Nb, Ta, or a combination thereof, the dielectric material particle includes about 2.5 moles (mol) to about 4 mol of the donor element, based on 100 mol of D, and a diameter of the dielectric material particle is in a range of from about 100 nanometers (nm) to about 300 nm.

The donor element may include a rare earth element.

The rare earth element may include La, Y, Dy, Sm, Nb, Ho, or a combination thereof.

The dielectric material particle may include a grain and a grain boundary and the grain boundary may further include an acceptor element of Mn, Co, Ni, Cr, Mg, or a combination thereof.

The acceptor element may be included in an amount of greater than 0 mol and less than or equal to about 1 mol, based on 100 mol of D.

The dielectric material particle may have a perovskite single phase.

The dielectric material may further include a silicon compound having a different crystal structure from the dielectric material particle.

The silicon compound may be included in an amount of greater than 0 mol and less than or equal to about 1 mol, based on 100 mol of D.

The dielectric material particle may include a grain and a grain boundary and the silicon compound may contact the grain boundary.

The dielectric material may have specific gravity of greater than or equal to about 0.95.

An oxygen defect ratio of the dielectric material relative to a total mass of the dielectric material may be less than or equal to about 0.01%.

An embodiment provides a multi-layered capacitor including a laminated structure including an internal electrode and a dielectric layer, wherein the dielectric layer includes the dielectric material.

At least two internal electrodes and/or at least two dielectric layers may be alternately arranged.

The dielectric layer may have a thickness of about 200 nm to about 500 nm.

An embodiment provides an electronic device including the dielectric material.

The electronic device may be a varistor, a thermistor, or a capacitor for storing energy.

Even if a particle diameter is reduced, a dielectric material exhibiting a high dielectric constant may be provided.

The multi-layered capacitor may form a dielectric layer using the dielectric material, and a down-sizing, i.e., reduction in size, a thin-film, and a high capacitance may be provided.

Furthermore, the electronic device may exhibit high integration and excellent efficiency by including the multi-layered capacitor which is down-sized, i.e., reduced in size, and thin-filmed, i.e., in the form of a thin film, and has a high capacitance.

DETAILED DESCRIPTION

Figure 1:
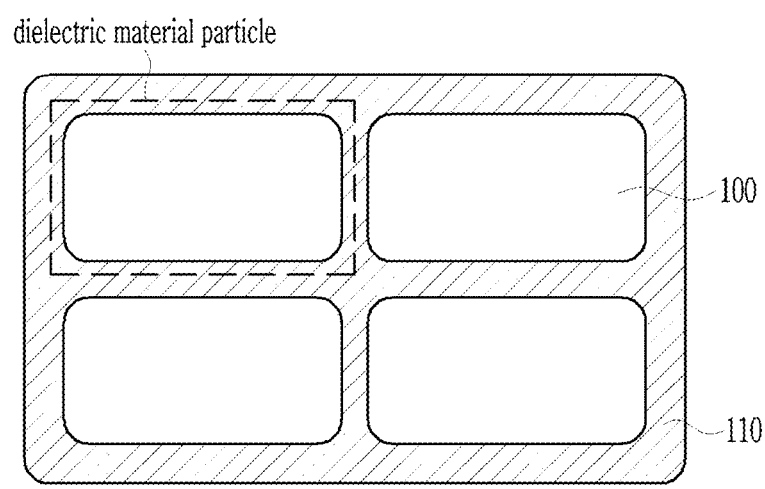
FIG. 1 is a schematic view showing a structure in which a dielectric material according to an embodiment is a barrier layer capacitor-type dielectric material.

Advantages and characteristics of this disclosure, and a method for achieving the same, will become evident referring to the following example embodiments together with the drawings attached hereto. However, the embodiments should not be construed as being limited to the embodiments set forth herein. If not defined otherwise, all terms (including technical and scientific terms) in the specification may be defined as commonly understood by one skilled in the art. The terms defined in a generally-used dictionary may not be interpreted ideally or exaggeratedly unless clearly defined. In addition, unless explicitly described to the contrary, the word "comprise" and variations such as "comprises" or "comprising", will be understood to imply the inclusion of stated elements but not the exclusion of any other elements.

Further, the singular includes the plural unless mentioned otherwise.

In the drawings, the thickness of layers, films, panels, regions, etc., are exaggerated for clarity. Like reference numerals designate like elements throughout the specification.

It will be understood that when a first element such as a layer, film, region, or substrate is referred to as being "on" second element, it can be directly on the other element or intervening elements may also be present. In contrast, when an element is referred to as being "directly on" another element, there are no intervening elements present.

"About" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used herein, relative permittivity refers to a relative dielectric constant and a ratio of a dielectric constant of another material relative to a dielectric constant of vacuum. The dielectric constant of vacuum is $8.854 \times 10^{-12}$ farads per meter (F/m) and a constant.

As used herein, "particle diameter" refers to a maximum size that a particle may have. For example, "particle diameter" means a longitudinal length when the particle has a shape of oval or a uniaxially elongated shape similar to the oval such as a sheet, a plate, or a needle, a diameter length in a case of a circle/spherical shape, or a farthest distance of a line connecting any two points in the particle boundary in a case of polygonal or amorphous shape.

The particle diameter in the present disclosure may be quantified by a method of measurement that provides an average size of the group of particles, for example, using a mode diameter providing the maximum value of the distribution, a median diameter corresponding to the median of the integrated distribution curved-line, and various average diameter (numeric average, length average, area average, mass average, volume average, etc.). Unless mentioned otherwise, the terms "average particle diameter" refers to a numerical average diameter which is measured in D50 (particle diameter at a point that distribution is 50%).

FIG. 1 is a schematic view showing a structure in which a dielectric material according to an embodiment is a boundary layer capacitor-type dielectric material.

The dielectric material according to an embodiment may be a boundary layer capacitor-type dielectric material. In this case, the dielectric material may include at least 2 grains (100) and a grain boundary (110) formed therebetween.

The dielectric material according to an embodiment includes a dielectric material particle as shown in FIG. 1. The dielectric material particle may have both a core consisted of grain (100) and a grain boundary (110) having a predetermined thickness leaving from the core of the grain (100) and disposed between adjacent grains (100).

The grain (100) may exhibit semi-conductivity or conductivity through a dielectric material particle. The grain boundary (110) may have insulative properties and may function to provide electrical insulation between adjacent grains (100).

In the dielectric material according to an embodiment, when a predetermined voltage is applied to the adjacent grain (100), a capacitance may be formed in the insulation grain boundary (110) formed between the adjacent grains (100). The plurality of grains (100) and the grain boundaries (110) are connected in serial and/or in parallel to each other, and the dielectric material may function overall as a capacitor having a predetermined capacitance.

The dielectric material according to an embodiment does not separately form a grain boundary (110) as a shell on a surface of grain (100) of a dielectric material particle. In an embodiment, a grain (100) and a grain boundary (110) are simultaneously formed during formation of a dielectric material particle.

In a boundary layer capacitor-type dielectric material, the grain boundary (110) may have a considerably thinner thickness than a size of the grain (100) in order to function as an insulator. In an embodiment, the grain boundary (110) may have a thickness of, for example, less than or equal to about 1% of the particle diameter of the grain (100).

Figure 2:
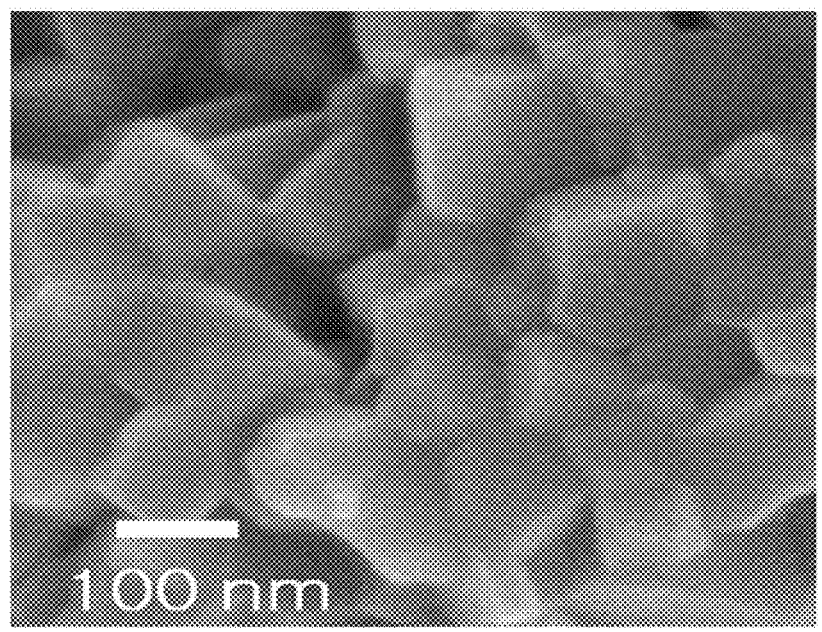
FIG. 2 is a scanning electron microscope (SEM) image showing a dielectric material according to an embodiment.

FIG. 2 is a scanning electron microscope (SEM) image of a dielectric material according to an embodiment.

Referring to FIG. 2, it is confirmed that at least two of dielectric material particles are agglomerated in the dielectric material according to an embodiment. The at least two of dielectric material particles which are agglomerated form a structure in which the grain (100) and the grain boundary (110) are repeated, e.g., a structure including a plurality of grains (100) and grain boundaries (110), as shown in FIG. 1.

Referring to FIG. 2, dielectric material particles according to an embodiment may have for example an average particle diameter of less than or equal to about 500 nm, less than or equal to about 450 nm, less than or equal to about 400 nm, less than or equal to about 350 nm, less than or equal to about 300 nm, less than or equal to about 250 nm, or less than or equal to about 200 nm, and for example greater than or equal to about 50 nm, greater than or equal to about 60 nm, greater than or equal to about 70 nm, greater than or equal to about 80 nm, greater than or equal to about 90 nm, or greater than or equal to about 100 nm, for example about 100 nm to about 400 nm, about 100 nm to about 300 nm, or about 200 nm to about 300 nm.

In a case of a multi-layer ceramic condenser used as a capacitor, a capacitance and a relative permittivity may be proportional to the number of layers of the dielectric layer, e.g., the number of layer of the dielectric layer that are laminated, and may be inversely proportional to a thickness of the dielectric layer. The thickness of the dielectric layer may be determined by a size of the dielectric material particle for the dielectric layer, and the size of the dielectric material particle may be proportional to a relative permittivity of the dielectric material. Accordingly, as the size of the dielectric material particle is reduced, the relative permittivity may be reduced, and it may not be possible to reduce the thickness of the dielectric layer below a predetermined thickness. Providing a thin film may be incompatible with providing a high dielectric constant.

The thickness of the dielectric layer for providing a permeable, e.g., desirable, level of a relative permittivity may be about 550 nm to about 1,000 nm. In order to provide the dielectric layer with a stable shape and a high reliability and a high relative permittivity, the dielectric material particle for one dielectric layer is desirably formed with at least about 2 layers (e.g., at least about 3 layers). A dielectric material particle may have a size, e.g., diameter, of about 0.8 micrometer to 1 micrometer, it may be difficult to form a dielectric layer having a desirable relative permittivity, and the dielectric layer may exhibit low reliability.

By controlling the dielectric material according to an embodiment to have an average particle diameter within the disclosed range, a dielectric layer having a high reliability and a high dielectric constant may be provided when employing the dielectric material particle to form a dielectric layer.

A dielectric material particle according to an embodiment may be represented by $ADO_3$, i.e., comprise a material represented by the formula $ADO_3$. Alternatively, the dielectric material particle may consist essentially of a material represented by the formula $ADO_3$, optionally together with other materials as described in further detail below. In $ADO_3$, A includes Sr, Ba, Ca, Pb, K, Na, or a combination thereof, and D includes Ti, Zr, Mg, Nb, Ta, or a combination thereof. The grain 100 of the dielectric material particle according to an embodiment may exhibit conductivity or semi-conductivity by selecting the material.

In an embodiment, the dielectric material particle may include $BaTiO_3$, $BaZrO_3$, $SrTiO_3$, or $SrZrO_3$. In an embodiment, the dielectric material particle may include $SrTiO_3$ or $SrZrO_3$. A non-limiting example of the dielectric material particle according to an embodiment may include a $SrTiO_3$ dielectric material particle.

The dielectric material particle according to an embodiment may have a perovskite crystal structure represented by $ABO_3$. According to an embodiment, the dielectric material particle may have a perovskite single phase.

The dielectric material particle may include a donor element. The donor element may be homogeneously doped in the dielectric material particle and may be included only in the grain (100). By adding the donor element, the conductivity or the semi-conductivity of the grain (100) may be enhanced.

The donor element may include a rare earth element. In an embodiment, the rare earth element may include La, Y, Dy, Sm, Nb, Ho, or a combination thereof.

The donor element may substitute a portion of the A elements in the dielectric material particle represented by $ADO_3$.

In an embodiment, the dielectric material particle may include a donor element in an amount of greater than about 2.4 mol, for example greater than or equal to about 2.5 mol, greater than or equal to about 5 mol, and less than or equal to about 4.5 mol, or less than or equal to about 4 mol, for example about 2.5 mol to about 4 mol, based on 100 mol of elements in the D position, e.g., based on 100 mol of D.

When the donor element amount in the dielectric material particle is greater than about 2.4 mol, the conductivity of the grain (100) is enhanced, and the conductivity difference between the grain (100) and the grain boundary (110) is increased. Even if the size of the dielectric material particle is reduced, the dielectric material may exhibit an excellent relative permittivity.

When the amount of the donor element in the dielectric material particle is less than or equal to about 4 mol, precipitation of the donor element in the dielectric material or formation of a secondary phase by the donor element may be suppressed. The precipitate or the secondary phase may deteriorate a relative permittivity of the dielectric material. The dielectric material according to an embodiment may control the dielectric material particle to form a perovskite single phase without forming the precipitate or the secondary phase by adjusting the amount of the donor element in the dielectric material particle in less than or equal to about 4 mol.

In the dielectric material according to an embodiment, the grain boundary (110) may further include an acceptor element of Mn, Co, Ni, Cr, Mg, or a combination thereof. According to an embodiment, the grain (100) may not include the acceptor element. An embodiment is not limited thereto, and the grain (100) may include a tiny amount of acceptor element relative to the grain boundary (110).

By distributing the acceptor element in the grain boundary (110), formation of a Schottky barrier of the grain boundary (110) may be accelerated. A resistivity of the grain boundary (110) may be improved, and the grain boundary (110) may have excellent insulative properties.

In order to improve insulative properties of the grain boundary (110), an amount of the acceptor element may be less than or equal to about 1 mol, less than or equal to about 0.8 mol, less than or equal to about 0.6 mol, or less than or equal to about 0.5 mol, for example greater than 0 mol and less than or equal to about 1 mol, based on 100 mol of elements in the D position.

When the grain boundary (110) includes the acceptor element in the same amount as mentioned above, the acceptor element may help improve the relative permittivity of the dielectric material, together with the donor element.

In an embodiment, the dielectric material is controlled so that the donor element is homogeneously doped in the dielectric material particle represented by $ADO_3$, and the acceptor element is homogeneously doped in the grain boundary (110) of the dielectric material particle. A conductivity of the grain of the dielectric material particle and an insulative property of the grain boundary (110) may be improved, the conductivity difference between the grain (100) and the grain boundary (110) may be increased, and the dielectric material may be provided with an excellent relative permittivity.

An embodiment is not necessarily limited thereto, and the acceptor element may be omitted depending upon a kind of the dielectric material, a kind of the donor element.

The dielectric material according to an embodiment may further include a silicon-based compound having a different crystal structure from the dielectric material particle. The silicon-based compound may be a compound obtained by firing the material used as a sintering agent during the forming a dielectric material. For example, the silicon-based compound may be a compound obtained by firing $SiO_2$.

The silicon-based compound may be contacted with, e.g., may contact, the grain boundary (110) of the dielectric material particle. In an embodiment, the silicon-based compound may not influence a chemical, structural change of the dielectric material particle and may have a different crystal structure from the dielectric material particle.

The silicon-based compound which may prevent the chemical, structural change of the dielectric material particle that may be caused by the silicon-based compound and help the agglomeration of the dielectric material particle may be included in an amount of less than or equal to 2 mol, based on 100 mol of elements in the D position, less than or equal to about 1.8 mol, less than or equal to about 1.6 mol, less than or equal to about 1.5 mol, less than or equal to about 1 mol, for example, greater than 0 and less than or equal to about 2.

An embodiment is not limited thereto, and when the material used as a sintering agent does not include a silicon-based compound, or when it does not use a sintering agent, the dielectric material according to an embodiment may not include a silicon-based compound.

The dielectric material according to an embodiment includes a dielectric material particle represented by $ADO_3$ as mentioned above, wherein the donor element having the amount and/or the material may be substituted at the D position of the dielectric material particle, and the acceptor element having the amount and/or the material may be optionally included in the grain boundary (110) of the dielectric material particle.

The dielectric material according to an embodiment may exhibit an excellent relative permittivity even if the size of the dielectric material particle is reduced/micronized to less than or equal to about 500 nm, for example, less than or equal to about 300 nm or from about 100 nm to about 300 nm.

A specific gravity of the dielectric material may be changed depending upon an average particle diameter of the dielectric material particle, and it may be, for example, greater than or equal to about 0.85, greater than or equal to about 0.90, greater than or equal to about 0.95, greater than or equal to about 0.98, greater than or equal to about 0.99, or greater than or equal to about 1, for example, about 0.95 to about 1. The specific gravity of the dielectric material may be measured according to a known method (Archimedes method).

When the dielectric material has the average particle diameter within the disclosed range, the dielectric material particles are densely disposed, and pores in the dielectric material may be reduced and a ratio of the dielectric material particles having a higher dielectric constant than air in the pores may be increased. Accordingly, the dielectric material may satisfy the specific gravity range by the small average particle diameter of the dielectric material particle.

An oxygen defect ratio of the dielectric material based on the total mass of the dielectric material according to an embodiment may be, for example, less than or equal to about 0.05%, less than or equal to about 0.04%, less than or equal to about 0.03%, less than or equal to about 0.02%, or less than or equal to about 0.01%.

The oxygen defect ratio of the dielectric material may be measured using a thermogravimetric analysis (TGA). When the oxygen defect ratio of the dielectric material satisfies the disclosed range, a dielectric material having an excellent relative permittivity may be provided.

In an embodiment, the dielectric material exhibits an excellent relative permittivity that may be caused by the donor and/or acceptor elements of the dielectric material, and an excellent reliability that may be caused by the specific gravity. Thus when the dielectric layer is formed using the dielectric material according to an embodiment, the thin film and the high dielectric constant characteristic may be simultaneously obtained.

The dielectric material according to an embodiment may be obtained by the following method. The manufacturing method according to an embodiment is not necessarily limited to the following method, and the dielectric material obtained by the following method may at least have the characteristics and the effects as shown above.

First, as the starting material, a material including elements in the A position and a material including elements in the D position are mixed with a material including the donor element and subjected to a primary reaction. A dielectric material particle intermediate represented by $ADO_3$ may be obtained, wherein the donor element is substituted in the D position.

In an embodiment, the mixing and primary reaction may be performed using a hydrothermal synthesis. When using the hydrothermal synthesis, all the starting materials are dissolved in water or an aqueous solution, and the dissolved starting materials are formed to a compound particle represented by $ADO_3$ according to an embodiment and grown.

In an embodiment, when using the hydrothermal synthesis, the dielectric material particle intermediate with a very small particle diameter compared to, for example, a solid-phase synthesis inducing a diffusion among the starting materials, may be provided.

Figure 3:
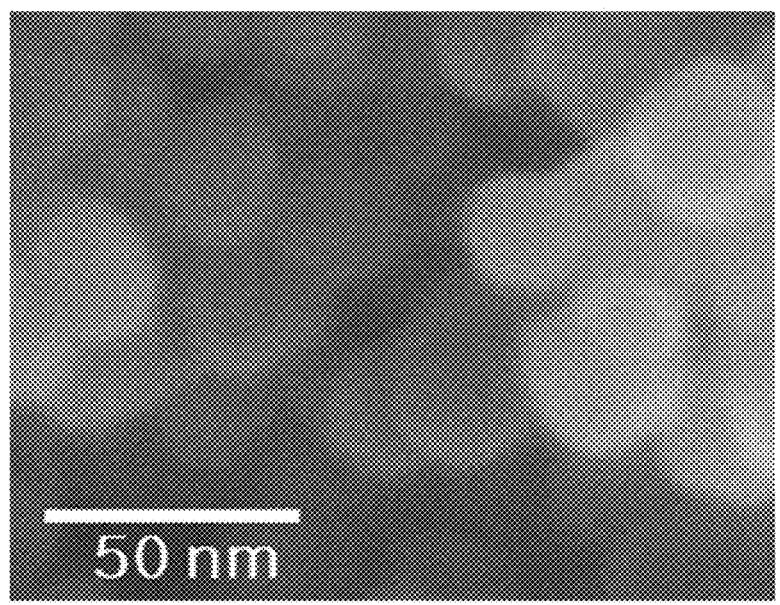
FIG. 3 is a SEM image showing a dielectric material particle intermediate produced from a hydrothermal synthesis according to an embodiment.

FIG. 3 is a SEM image showing a dielectric material particle intermediate according to an embodiment.

For example, the dielectric material particle intermediate obtained using the solid-phase synthesis has a particle diameter (about 0.8 micrometers to 1.5 micrometers). The dielectric material particle intermediate obtained using the hydrothermal synthesis according to an embodiment may have a particle diameter of, for example, less than or equal to about 150 nm, less than or equal to about 100 nm, or less than or equal to about 50 nm as shown in FIG. 3, which may be changed depending upon the detail conditions of the hydrothermal synthesis.

When dielectric material particle intermediate is obtained by the hydrothermal synthesis, the intermediate may have a particle diameter of several tens of nanometers. The dielectric material with a small particle diameter of less than or equal to about 500 nm, for example, less than or equal to about 300 nm, may be provided.

In an embodiment, the hydrothermal synthesis may be performed at a temperature condition in a range of about 200° C. to about 300° C.

According to an embodiment, the hydrothermal synthesis may be performed in an air atmosphere.

In an embodiment, the hydrothermal synthesis may be performed at a pressure in a rage of, for example, about 20 bar to about 50 bar, about 30 bar to about 50 bar, or about 40 bar.

A solvent used in the hydrothermal synthesis may be water in an embodiment.

According to an embodiment, the hydrothermal synthesis is performed at a relative low temperature, unlike a solid-phase synthesis that may be performed at a considerably high temperature (e.g., greater than or equal to about 1,000° C., or greater than or equal to about 1,200° C.). Accordingly, when using the hydrothermal synthesis, the dielectric material particle intermediate with a small particle diameter may be provided, for example, in a relatively easy method, e.g., at relatively mild conditions.

Then the obtained dielectric material particle intermediate and, optionally, a material including an acceptor element and/or a sintering agent are mixed and then subjected to a reduction sintering.

In an embodiment, the reduction sintering may be performed at the predetermined temperature and atmosphere conditions.

The predetermined temperature may be, for example, about 1,000° C. to about 1,400° C., for example, about 1,100° C. to about 1,300° C.

The predetermined atmosphere may be a mixed gas atmosphere of, for example, $N_2$ and $H_2$. The mixing ratio (volume ratio) of $N_2$ and $H_2$ may be about 100:1, but is not limited thereto.

The reduction sintering may be performed for about 1 hour to about 3 hours, or about 2 hours.

When any one of the reduction sintering conditions of the temperature, the atmosphere, and the time is changed within the disclosed range, the other conditions may be each changed within the disclosed ranges.

The particle of the dielectric material particle intermediate may be grown through the reduction sintering. According to an embodiment, the dielectric material particle intermediate which is reduction sintered has an average particle diameter similar to or the same as the dielectric material particle.

The dielectric material may be obtained by re-oxidizing the dielectric material particle intermediate which is reduction-sintered at the predetermined temperature and atmosphere conditions.

The re-oxidizing process may enhance the insulative properties by oxidizing the grain boundary of the dielectric material particle intermediate. The conductivity difference between the grain and the grain boundary may be increased by the re-oxidation process, and the dielectric material according to an embodiment may satisfy the thin film and the high dielectric constant characteristics, simultaneously.

In an embodiment, the re-oxidation may be performed at a temperature lower than the reduction sintering. The re-oxidation temperature may be, for example, less than or equal to about 1,100° C., or less than or equal to about 1,050° C. and greater than or equal to about 600° C., greater than or equal to about 650° C., or greater than or equal to about 750° C.

In an embodiment, the re-oxidation may be performed in an atmosphere of air, nitrogen ($N_2$), or 1 volume % of more of $O_2$. In an embodiment, the re-oxidation may be performed in an air atmosphere.

The dielectric material obtained through the process may minimize inner pores during the reduction sintering and the re-oxidation as the dielectric material particle intermediate having a particle diameter of several tens of nanometers is prepared using the hydrothermal synthesis. For example, the dielectric material obtained using the solid-phase synthesis has a specific gravity of less than or equal to about 0.80; and the dielectric material according to an embodiment shows a specific gravity of greater than or equal to about 0.95.

Accordingly, the dielectric material according to an embodiment may exhibit an excellent relative permittivity that may be caused by the high specific gravity as described above.

As described above, the dielectric material having an excellent relative permittivity may be obtained by using a method of manufacturing a dielectric material according to an embodiment.

Hereinafter, a structure of a multi-layered capacitor including the dielectric material according to an embodiment is described with reference to FIG. 4.

Figure 4:
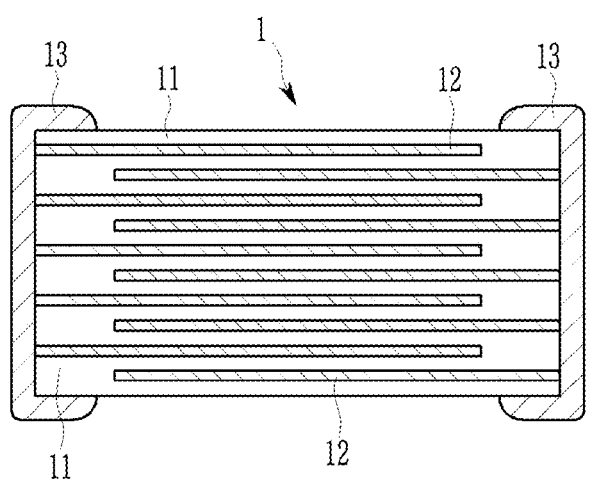
FIG. 4 is a schematic view showing a multi-layered capacitor according to an embodiment.

FIG. 4 schematically shows a multi-layered capacitor according to an embodiment.

The multi-layered capacitor (1) according to an embodiment includes a structure of alternatively laminating an internal electrode (12) and a dielectric layer (11), wherein the dielectric layer (11) includes the dielectric material according to an embodiment.

In the multi-layered capacitor (1) according to an embodiment, as shown in FIG. 4, the internal electrode (12) and the dielectric layer (11) may be alternatively arranged and laminated in two or more times, i.e., two or more internal electrodes (12) and two or more dielectric layers (11) may be alternatively arranged and laminated. The adjacent internal electrodes and a dielectric layer disposed therebetween may function as a unit capacitor.

In a case of the multi-layered capacitor (1) according to an embodiment, the internal electrode (12) and the dielectric layer (11) may be alternatively laminated in greater than or equal to about 2 times, greater than or equal to about 3 times, greater than or equal to about 4 times, greater than or equal to about 5 times, and the multi-layered capacitor (1) may exhibit a capacitance that may be caused by the parallel structure of the internal unit capacitors.

The internal electrode (12) may be formed to have a smaller area than the area of the dielectric layer (11). The internal electrodes (12) may have the same areas as each other, the adjacent internal electrodes may not completely cover each other, e.g., may not be aligned with each other, and laminating may provide a zigzag pattern, as shown in FIG. 4.

The dielectric layer (11) may be formed to have a larger area than the area of the internal electrode (12), and the adjacent dielectric layers are connected to each other to provide a cross-sectional surface thereof with an overall serpentine shape, as shown in FIG. 4.

The multi-layered capacitor (1) according to an embodiment may further include a pair of external electrodes (13) surrounding both lateral sides of the structure of laminating the dielectric layer (11) and the internal electrode (12). An embodiment is not necessarily limited thereto, and the external electrode may be omitted, and the internal electrodes may be elongated to the both sides of the structure of laminating the dielectric layer and the internal electrode, or a power source may be connected to the internal electrode without the external electrode.

The multi-layered capacitor may include a plurality of dielectric layers and internal electrodes, and the total thickness of the dielectric layer may help determine the ability to reduce the size and the thickness of a film of a multi-layered capacitor. A dielectric layer of a multi-layered capacitor may include $BaTiO_3$, $PbTiO_3$, or the like as a material for the dielectric material, and the relative permittivity may be decreased with decreasing thickness as described above.

Thus when reducing the total thickness of the dielectric layer in a multi-layered capacitor in a thin film, reducing a thickness of one layer of the dielectric layer may be limited to about 550 nm to about 600 nm. In this case, a dielectric layer may exhibit a relative permittivity of about 2,000 to about 3,000. When the thickness of a dielectric layer is made in an ultra-thin film below the range limit, the relative permittivity relative to the thickness decrease may decrease rapidly, and the dielectric layer may not be suitably in a multi-layered capacitor.

In a case of the multi-layered capacitor (1) according to an embodiment, the dielectric layer (11) include the dielectric material, so a thickness of one layer of the dielectric layer (11) may be reduced to a thickness of less than or equal to about 500 nm, less than or equal to about 400 nm, less than or equal to about 300 nm, for example, about 100 nm to about 500 nm, about 200 nm to about 500 nm, or about 200 nm to about 300 nm.

Even if a thickness of the dielectric layer (11) is reduced within the disclosed range, the multi-layered capacitor (1) according to an embodiment may exhibit an excellent relative permittivity as the dielectric layer (11) includes the dielectric material. In an embodiment, while the relative permittivity of the multi-layered capacitor (1) may be changed depending upon a thickness of one layer of the dielectric layer (11), and the number of laminated dielectric layers (11), the relative permittivity may be, for example, greater than or equal to about 5,000, greater than or equal to about 6,000, greater than or equal to about 7,000, greater than or equal to about 8,000, greater than or equal to about 9000, greater than or equal to about 10,000, greater than or equal to about 20,000, or greater than or equal to about 40,000.

In an embodiment, in the multi-layered capacitor (1), the thickness of one layer of the dielectric layer (11) may be considerably reduced, and the number of laminated dielectric layers (11) in the multi-layered capacitor (1) and the capacitance may be improved.

According to an embodiment, the multi-layered capacitor (1) both having a thin film and exhibiting a high dielectric constant may be provided.

An embodiment provides an electronic device including the dielectric material. The electronic device may have the dielectric material in a single layer or a multiple of layers as in the multi-layered capacitor (1). The electronic device according to an embodiment may be a device functioning as a kind of a variable resistor such as a varistor, a thermistor, or a capacitor for storing energy.

As the electronic device according to an embodiment includes the multi-layered capacitor which is down-sized and thin-filmed and has a high capacitance, the electronic device may exhibit high integration and excellent efficiency.

Hereinafter, specific examples are illustrated. However, these examples are exemplary and the scope of the present disclosure is not limited thereto.

Example 1

Starting materials of $Sr(OH)_2$ and $TiO_2$ sol are weighed to provide a mole ratio of $SrTiO_3$. As a donor element, a La-containing solution is weighed to provide 2.5 mol based on 100 mol of Ti.

The weighed $Sr(OH)_2$, $TiO_2$ sol, and La-containing solution are added to water and subjected to a hydrothermal synthesis at 260° C. and 40 bar. The synthesized dielectric material particle intermediate may be represented by $Sr_{0.975}La_{0.025}TiO_3$ and have a micro structure shown in FIG. 3. The dielectric material particle intermediate has a particle diameter of less than or equal to about 50 nm.

An acceptor element of a Mn-containing material and a sintering agent of $SiO_2$ are each weighed in an amount of 0.5 mol based on 100 mol of Ti of the dielectric material particle intermediate.

Then the synthesized dielectric material particle intermediate and the weighed Mn-containing material and sintering agent are mixed with ethanol using a $ZrO_2$ ball having a particle diameter of 3 millimeters (mm) to 5 mm according to a ball mill process for 15 to 20 hours and then dried. Then the dried powder is processed into a pellet by a cold isostatic press (CIP) under a pressure of about 250 megapascals (MPa).

Then the pellet is reduction fired at 1,250° C. under $N_2$—$H_2$ mixed gas atmosphere ($N_2$:$H_2$=100:1, a volume ratio basis) for about 2 hours, and re-oxidized at 1,000° C. in an air atmosphere for about 2 hours to provide a dielectric material of Example 1.

The dielectric material of Example 1 includes dielectric material particles having an average particle diameter of less than or equal to about 300 nm, for example, an average particle diameter of 100 nm to 300 nm and a specific gravity of greater than or equal to 0.95, and an oxygen defect ratio of the dielectric material is less than or equal to 0.01% based on the total mass of the dielectric material.

Example 2

A dielectric material of Example 2 is obtained in accordance with the same procedure as in Example 1, except that as a donor element, the La-containing solution is provided in an amount of 3.0 mol based on 100 mol of Ti.

Example 3

A dielectric material of Example 3 is obtained in accordance with the same procedure as in Example 1, except that as a donor element, the La-containing solution is provided in an amount of 4.0 mol based on 100 mol of Ti.

Figure 5:
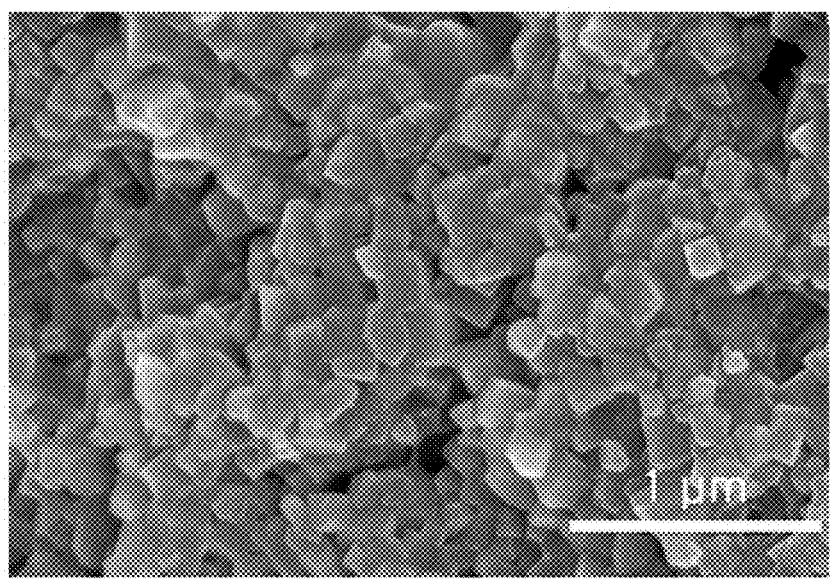
FIG. 5 is a SEM image showing a dielectric material of Example 3.

FIG. 5 is a SEM image of a dielectric material of Example 3.

Referring to FIG. 5, it is confirmed that the dielectric material of Example 3 includes dielectric material particles having an average particle diameter of about 100 nm to about 300 nm.

Comparative Example 1

A dielectric material of Comparative Example 1 is obtained in accordance with the same procedure as in Example 1, except that as a donor element, the La-containing solution is provided in an amount of 1.4 mol based on 100 mol of Ti.

Comparative Example 2

A dielectric material of Comparative Example 2 is obtained in accordance with the same procedure as in Example 1, except that as a donor element, the La-containing solution is provided in an amount of 1.6 mol based on 100 mol of Ti.

Figure 6:
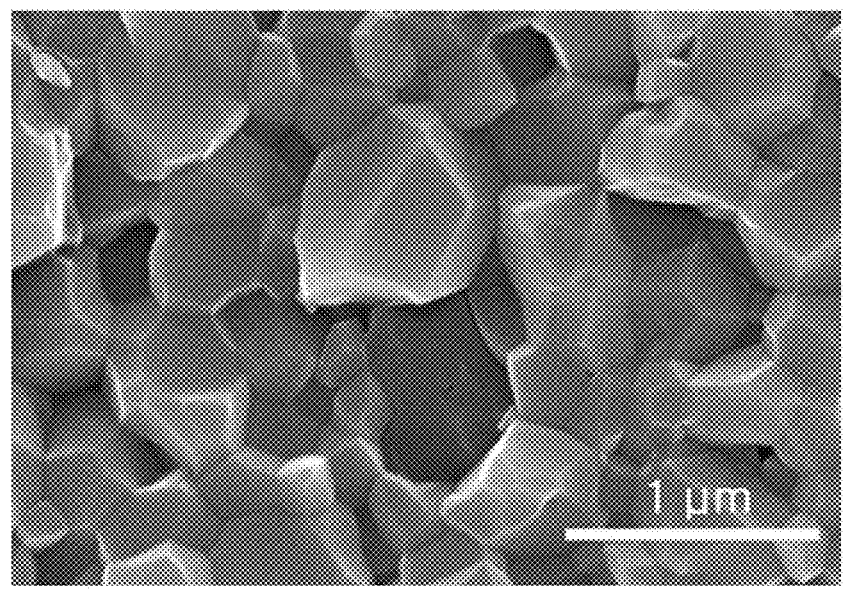
FIG. 6 is a SEM image showing a dielectric material of Comparative Example 2.

FIG. 6 is a SEM image of a dielectric material of Comparative Example 2.

Referring to FIG. 6, it is confirmed that the dielectric material of Comparative Example 2 includes large dielectric material particles having an average particle diameter of greater than 500 nm, for example, 500 nm to 1,000 nm, unlike in Example 3.

Comparative Example 3

A dielectric material of Comparative Example 3 is obtained in accordance with the same procedure as in Example 1, except that as a donor element, the La-containing solution is provided in an amount of 1.8 mol based on 100 mol of Ti.

Comparative Example 4

A dielectric material of Comparative Example 4 is obtained in accordance with the same procedure as in Example 1, except that as a donor element, the La-containing solution is provided in an amount of 2.0 mol based on 100 mol of Ti.

Comparative Example 5

A dielectric material of Comparative Example 5 is obtained in accordance with the same procedure as in Example 1, except that as a donor element, the La-containing solution is provided in an amount of 2.4 mol based on 100 mol of Ti, and the weighed $Sr(OH)_2$, $TiO_2$ sol, and La-containing solution are subjected to a solid-phase synthesis at 1350° C. in an air atmosphere to provide a dielectric material particle intermediate having an average particle diameter of about 1 micrometer.

Comparative Example 6

A dielectric material of Comparative Example 6 is obtained in accordance with the same procedure as in Comparative Example 5, except that as a donor element, the La-containing solution is provided in an amount of 2.5 mol based on 100 mol of Ti. Comparative Example 6 includes the same amount of La as in Example 1, but solid-phase synthesis is used for preparing the dielectric material particle intermediate.

Evaluation 1: Average Particle Diameter and Relative Permittivity Depending Upon Donor Element Amount in Dielectric Material Particle For the dielectric materials of Examples 1 to 3 and Comparative Examples 1 to 4, the average particle diameter of the dielectric material particle is shown in FIG. 7; and the relative permittivity is shown in FIG. 8.

Figure 7:
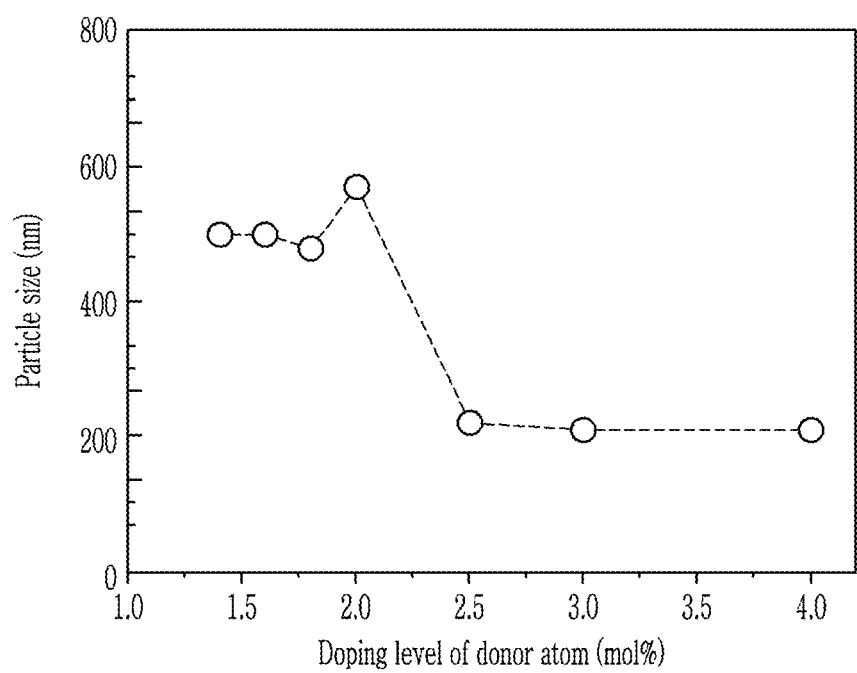
FIG. 7 is a graph of particle size (nm) versus doping level of donor atom (mol %) showing how an average particle diameter is changed depending upon a doping level of donor element in dielectric materials of the Examples and Comparative Examples.
Figure 8:
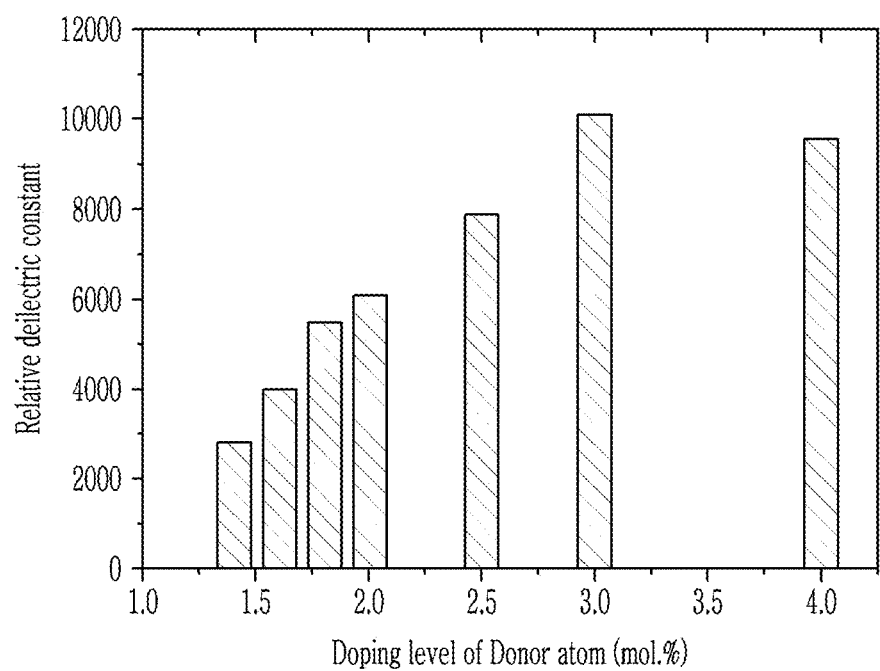
FIG. 8 is a graph of relative dielectric constant versus doping level of donor atom (mol. %) showing how a relative dielectric constant is changed depending upon a doping level of a donor element in dielectric materials of the Examples and Comparative Examples.

FIG. 7 is a graph showing an average particle diameter change according to a doping level of a donor element in dielectric materials of the Examples and Comparative Examples.

Referring to FIG. 7, as in Comparative Examples 1 to 4, the dielectric material particle including the La amount of 1.4 mol to 2.0 mol based on 100 mol of Ti shows an average particle diameter of about 480 nm to about 600 nm. The dielectric material particle has an average particle diameter of less than or equal to about 300 nm, for example, about 200 nm to about 300 nm when satisfying the La amount of about 2.5 mol to about 4.0 mol based on 100 mol of Ti as in Examples 1 to 3.

As in Examples 1 to 3, as the La amount is increased to greater than or equal to about 2.5 mol based on 100 mol of Ti, vacancy in the Si particle surface is increased depending upon a La doping level, a speed of growing a particle is reduced, and it is confirmed that the dielectric material particle is down-sized/micronized.

FIG. 8 is a graph showing a relative permittivity change depending upon a doping level of a donor element in the dielectric materials of the Examples and Comparative Examples. In FIG. 8, the relative permittivity shows the results of being measured under conditions of 1 kHz and 1 V.

Referring to FIG. 8, when the La amount is within a range of 1.4 mol to 2.0 mol based on 100 mol of Ti as in Comparative Examples 1 to 4, it is confirmed that it shows a relative permittivity of about 2,500 to about 6,000. From Comparative Examples 1 to 4, it can be seen that as the La amount is increased, the relative permittivity is gradually increased.

When the La amount is within a range of about 2.5 mol to about 4.0 mol based on 100 mol of Ti as in Examples 1 to 3, it is confirmed that the dielectric material shows a relative permittivity of about 8,000 to about 10,000.

From FIG. 8, it is confirmed that the relative permittivity of the dielectric material may increase as the donor element level in the dielectric material is increased. Examples 1 to 3 in a range of 2.5 mol to 4.0 mol show an excellent relative permittivity, compared to the Comparative Examples.

Evaluation 2: Whether Precipitation is Formed and Whether Secondary Phase is Formed in Dielectric Material Particle The electron microprobe analysis (EMPA) results for the dielectric material of Example 3 are shown in FIGS. 9 to 11.

Figure 9:
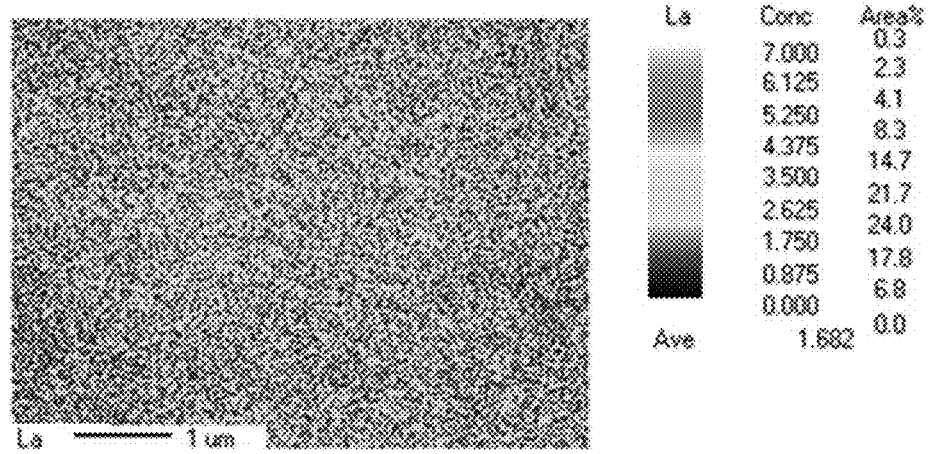
FIGS. 9 to 11 are images showing Electron Microprobe Analysis (EMPA) results for a dielectric material of Example 3.

FIG. 9 is an image showing the inductively coupled plasma analysis results of La in the dielectric material of Example 3; FIG. 10 is an image showing the inductively coupled plasma analysis results of Sr; and FIG. 11 is an image showing the inductively coupled plasma analysis results of Ti.

Figure 10:
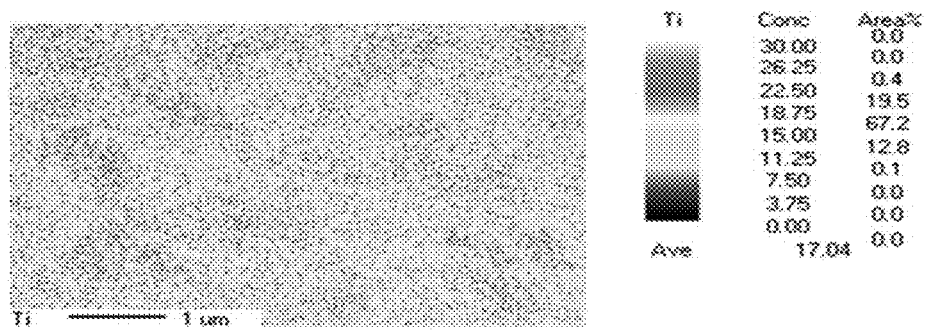
Figure 11:
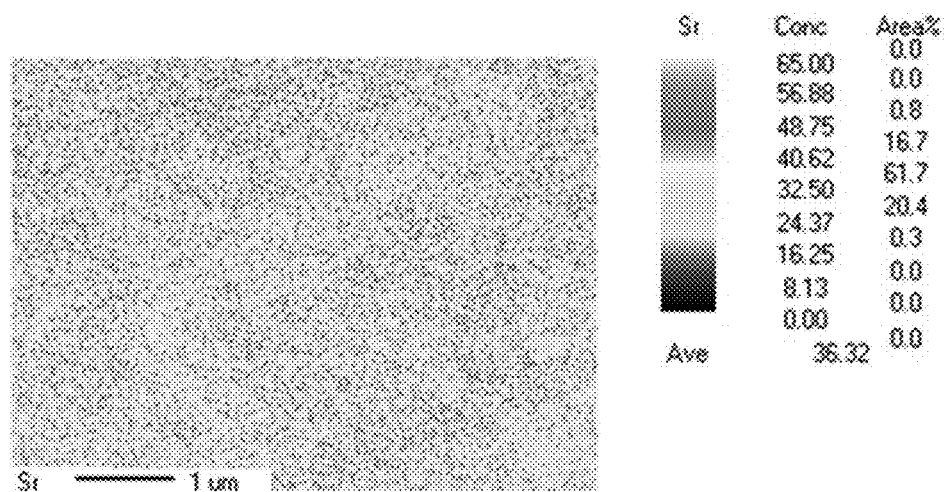

Referring to FIGS. 9 to 11, it is confirmed that with La or Sr, Ti is not precipitated although the dielectric material includes La in 4.0 mol based on 100 mol of Ti.

Figure 12:
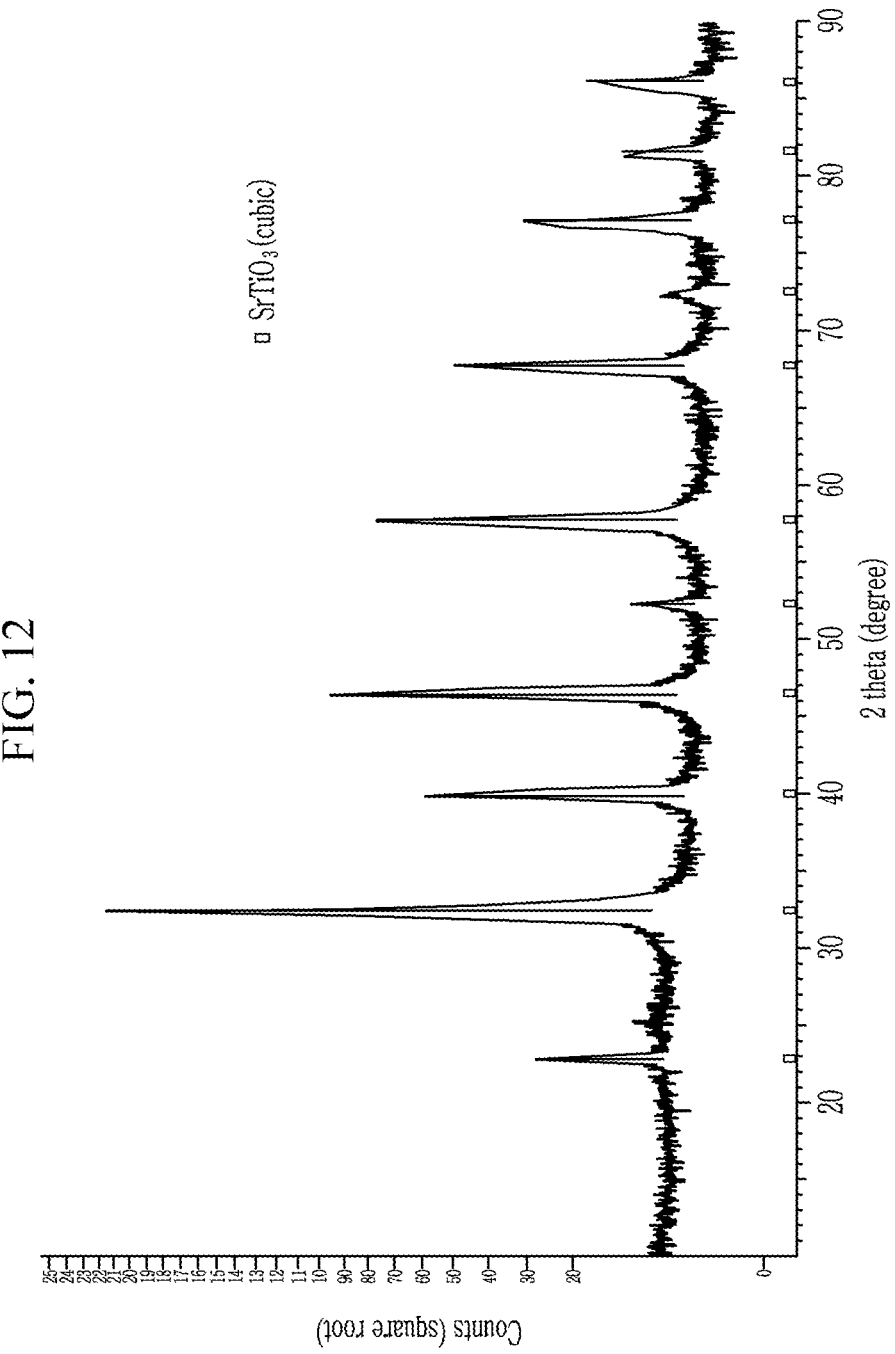
FIG. 12 shows Inductively Coupled Plasma (ICP) analysis results of a dielectric material of Example 3.
Figure 13:
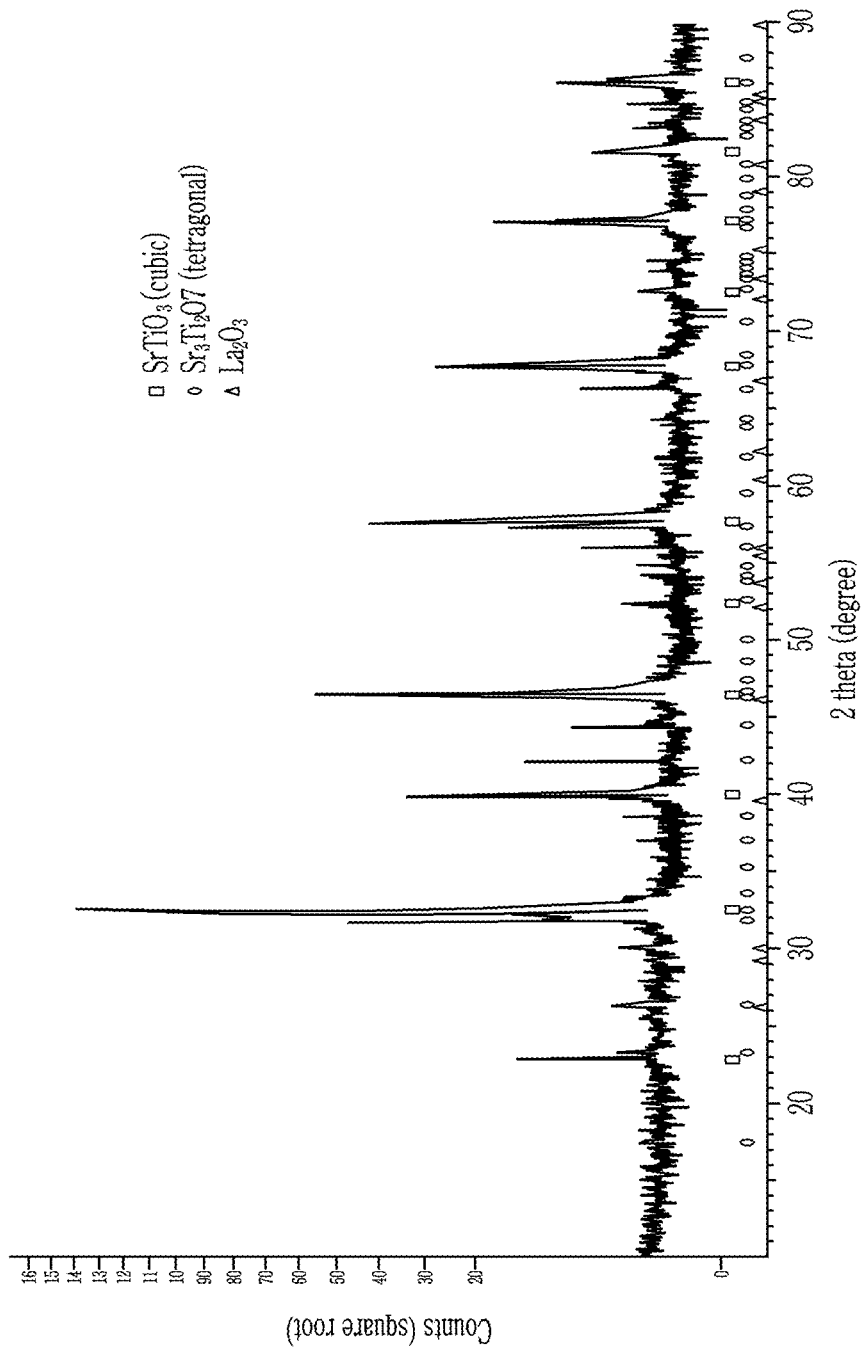
FIG. 13 shows Inductively Coupled Plasma (ICP) analysis results of a dielectric material of Comparative Example 5.

The inductively coupled plasma (ICP) analysis results of the dielectric material of Example 3 and Comparative Example 5 are shown in FIGS. 12 and 13, respectively. In FIGS. 12 and 13, the positions of peaks of a predetermined phase in a basis of a diffraction angle (2theta) are indicated with a square, a circle, and a triangle.

FIG. 12 shows an inductively coupled plasma analysis result of the dielectric material of Example 3; and FIG. 13 shows an inductively coupled plasma analysis result of the dielectric material of Comparative Example 5.

Referring to FIG. 12, it is confirmed that the dielectric material of Example 3 has a perovskite single phase represented by $SrTiO_3$, and the lattice structure thereof is cubic.

Referring to FIG. 13, the dielectric material of Comparative Example 5 has a perovskite main phase represented by $SrTiO_3$ and two different secondary phases (a phase represented by $Sr_3Ti_2O_7$ and having a tetragonal lattice structure and a phase represented by $La_2O_3$). Among the secondary phases, $Sr_3Ti_2O_7$ is considered as a phase generated from a reaction of $SrTiO_3$ and SrO, and $La_2O_3$ is considered as a phase precipitated by adding an excess amount of La.

From the results of FIGS. 9 and 13, it is confirmed that the crystal structure of the final dielectric material is changed according to which synthesis method is used in the process of preparing the dielectric material particle precursor.

In a case of Comparative Example 5 using a solid-phase synthesis, a decrease in a relative permittivity is expected, for example, due to the presence of the secondary phases ($Sr_3Ti_2O_7$ and $La_2O_3$), and although Example 3 has a higher La amount than in Comparative Example 5, Example 3 is expected to exhibit an excellent relative permittivity, for example, since it has a perovskite single phase.

Evaluation 3: Oxygen Defect Ratio in Dielectric Material Particle

Figure 14:
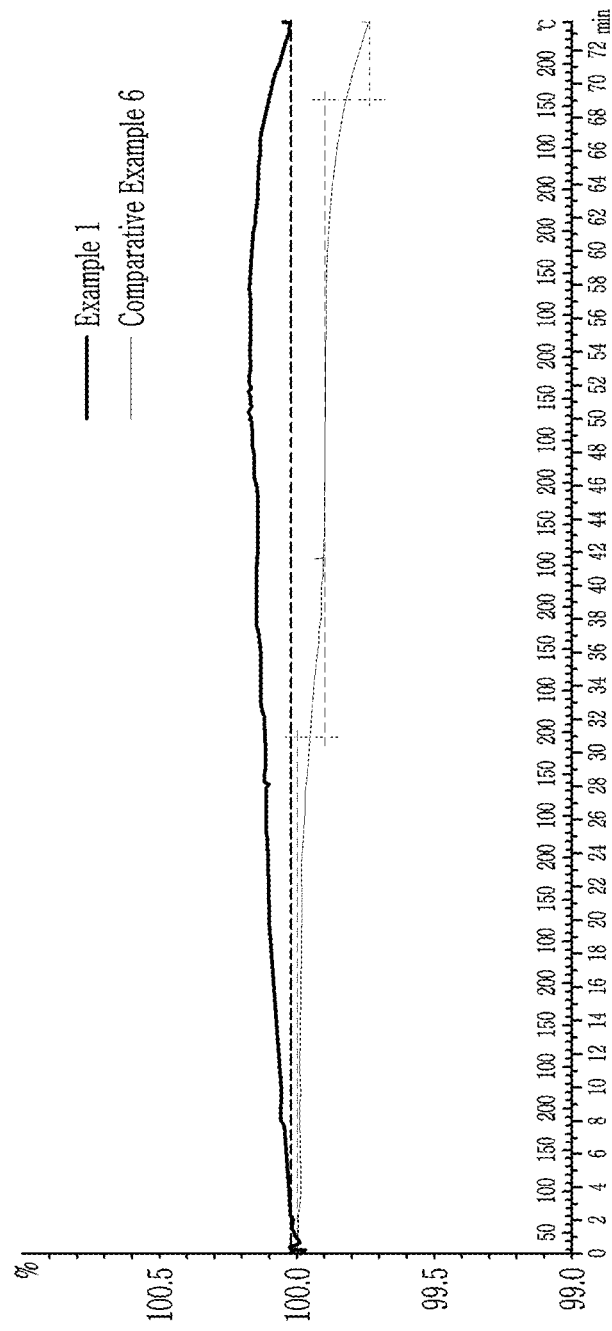
FIG. 14 shows a thermogravimetric analysis (TGA) result for dielectric materials of Example 1 and Comparative Example 6.

Each dielectric material of Example 1 and Comparative Example 6 is subjected to a thermogravimetric analysis (TGA) at 1500° C. in a $N_2$ atmosphere, and the results are shown in FIG. 14.

FIG. 14 shows the thermogravimetric analysis results of the dielectric materials of Example 1 and Comparative Example 6.

Referring to FIG. 14, it is confirmed that the dielectric material of Example 1 has a mass decrease rate depending upon a temperature of less than or equal to 0.01% based on the total mass of the dielectric material, and the dielectric material of Comparative Example 6 has a mass decrease rate of about 0.1% to about 0.3%.

When the same dielectric materials are annealed at about 400° C. in an air atmosphere for 15 hours, two dielectric materials show a similar mass decrease level.

Thus the mass decrease in FIG. 14 may be caused by oxygen vacancy in the dielectric material, and the mass decrease rate of FIG. 14 may be considered as an oxygen defect ratio in the dielectric material.

In an embodiment, the dielectric material of Example 1 has an oxygen defect ratio of less than or equal to about 0.01% which is improved relative to Comparative Example 6, and the dielectric material of Example 1 is expected to exhibit improved relative permittivity relative to Comparative Example 6.

While this disclosure has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. A dielectric material comprising
a dielectric material particle represented by $ADO_3$,
wherein A comprises Sr, Ba, Ca, Pb, K, Na, or a combination thereof,
D comprises Ti, Zr, Mg, Nb, Ta, or a combination thereof,
the dielectric material particle comprises about 2.5 moles to about 4 moles of a donor element, based on 100 moles of D, and
a diameter of the dielectric material particle is in a range of from about 100 nanometers to about 300 nanometers.

2. The dielectric material of claim 1, wherein the donor element comprises a rare earth element.

3. The dielectric material of claim 2, wherein the rare earth element comprises La, Y, Dy, Sm, Nb, Ho, or a combination thereof.

4. The dielectric material of claim 1, wherein
the dielectric material particle comprises a grain and a grain boundary, and
the grain boundary further comprises an acceptor element, wherein the acceptor element comprises Mn, Co, Ni, Cr, Mg, or a combination thereof.

5. The dielectric material of claim 4, wherein the acceptor element is included in an amount of greater than 0 moles and less than or equal to about 1 mole, based on 100 moles of D.

6. The dielectric material of claim 1, wherein the dielectric material particle comprises a perovskite single phase.

7. The dielectric material of claim 1, wherein the dielectric material further comprises a silicon compound having a different crystal structure from the dielectric material particle.

8. The dielectric material of claim 7, wherein the silicon compound is included in an amount of greater than 0 mole and less than or equal to about 1 moles, based on 100 moles of D.

9. The dielectric material of claim 7, wherein
the dielectric material particle comprises a grain and a grain boundary, and
the silicon compound contacts the grain boundary.

10. The dielectric material of claim 1, wherein the dielectric material has specific gravity of greater than or equal to about 0.95.

11. The dielectric material of claim 1, wherein an oxygen defect ratio of the dielectric material relative to a total mass of the dielectric material is less than or equal to about 0.01%.

12. A multi-layered capacitor comprising
a laminated structure comprising an internal electrode and a dielectric layer,
wherein the dielectric layer comprises the dielectric material of claim 1.

13. The multi-layered capacitor of claim 12, comprising at least two of the internal electrodes and/or at least two of the dielectric layers, wherein each internal electrode and each dielectric layer are alternately arranged.

14. The multi-layered capacitor of claim 12, wherein the dielectric layer has a thickness of about 200 nanometers to about 500 nanometers.

15. An electronic device comprising the dielectric material of claim 1.

16. The electronic device of claim 15, wherein the electronic device is a varistor, a thermistor, or a capacitor for storing energy.

* * * * *